(12) United States Patent
Dai et al.

(10) Patent No.: US 7,022,799 B2
(45) Date of Patent: Apr. 4, 2006

(54) LADDER-LIKE SILICONE POLYMERS

(76) Inventors: Jie Dai, c/o DSO National Laboratories, 20 Science Park Drive, Singapore (SG) 118230; Chaoran Deng, c/o DSO National Laboratories, 20 Science Park Drive, Singapore (SG) 118230

(*) Notice: Subject to any disclaimer, the term of this patent is extended or adjusted under 35 U.S.C. 154(b) by 363 days.

(21) Appl. No.: 10/268,540

(22) Filed: Oct. 9, 2002

(65) Prior Publication Data
US 2003/0212228 A1   Nov. 13, 2003

(30) Foreign Application Priority Data
May 2, 2002   (SG) .............................. 200202592

(51) Int. Cl.
C08G 77/06   (2006.01)
(52) U.S. Cl. ...................... 528/12; 106/287.16; 528/14
(58) Field of Classification Search .................... None
See application file for complete search history.

(56) References Cited

U.S. PATENT DOCUMENTS

| | | | |
|---|---|---|---|
| 3,017,386 A | 1/1962 | Brown, Jr. et al. | |
| 3,372,133 A | 3/1968 | Krantz | |
| 4,528,390 A | 7/1985 | Kimura | |
| 4,746,693 A | 5/1988 | Meder | |
| 5,026,813 A | 6/1991 | Meder | |
| 5,081,202 A | 1/1992 | Adachi et al. | |
| 5,086,145 A | 2/1992 | Morimoto et al. | |
| 5,399,648 A | 3/1995 | Yamamoto et al. | |
| 5,491,203 A | 2/1996 | Matsui et al. | |
| 5,859,162 A | 1/1999 | Yamamoto et al. | |
| 5,939,500 A | 8/1999 | Itoh et al. | |
| 5,981,670 A | 11/1999 | Itoh et al. | |
| 6,008,310 A | 12/1999 | Itoh et al. | |
| 6,037,434 A | 3/2000 | De Buyl et al. | |
| 6,133,137 A * | 10/2000 | Usami ........................ 438/622 | |
| 6,153,689 A | 11/2000 | Itoh et al. | |
| 6,211,323 B1 | 4/2001 | Akinaga et al. | |
| 2003/0008522 A1* | 1/2003 | Endisch et al. ............. 438/758 | |
| 2003/0198895 A1* | 10/2003 | Toma et al. ................. 430/314 | |

FOREIGN PATENT DOCUMENTS

| | | |
|---|---|---|
| EP | 0786489 | 7/1997 |
| EP | 0967237 A1 | 12/1999 |
| JP | 3112686 B2 | 5/1991 |
| JP | 10087834 A | 4/1998 |
| JP | 11292971 | 10/1999 |
| JP | 2000103855 | 4/2000 |

OTHER PUBLICATIONS

Xie, Z., et al., "Study on the synthesis and characterization of the soluble, high molecular weight and ladder-like polymethysilsesquioxanes," *Chinese J. of Polymer Sci* 7(2):183-188, 189.

Xie, Z,. et al., "Synthesis and characterization of the soluble, high molecular weight and ladder-like polyhydrosilsesquioxanes and its copolymers," *Chinese J. of Polymer Sci.* 10(4):361-365, 1992.

Xie, P., et al., "In situ poling and orientation stability of chromophore-bearing ladder-like polysiloxanes," *Polymers for Advanced Technologies* 7:98-103, 1996.

Zhang et al., "The synthesis and X-ray diffraction study of the ladder-like polysilsesquioxanes with side-chain ester groups," *Polymers for Advanced Technologies* 8:662-665, 1997.

* cited by examiner

*Primary Examiner*—Marc S. Zimmer
(74) *Attorney, Agent, or Firm*—Klarquist Sparkman, LLP (57) ABSTRACT

There is disclosed a three stage method for the preparation of ladder-like silicone polymers. The first stage comprises hydrolysis and polymerization of alkyltrialkoxylsilane-like monomers to give relatively low molecular weight prepolymers. The second stage comprises dehydrated condensation polymerization of the prepolymers to give high molecular weight polymers. The third stage comprises partial blocking of a proportion of the pendant Si—OH (silanol) groups with a pre-determined sub-stoichiometric amount of a blocking agent. Also disclosed are the prepolymers, polymers and partially blocked polymers so produced.

46 Claims, 3 Drawing Sheets

LADDER-LIKE SILICONE POLYMERS

THE PRESENT INVENTION relates to the synthesis of ladder-like silicone polymers and the ladder-like silicone polymers so produced.

Ladder-like silicone polymers which contain one alkyl side chain and 1.5 oxygen atoms per silicon atom are termed polyalkylsilsesquioxanes. Due to their ladder-like structure, polyalkylsilsesquioxanes have good electrical insulation, optical transparency, water repellence, flame retardance, good heat, weather, water and chemical resistance, high hardness and mechanical strength.

There are many publications relating to the synthesis of such ladder-like polyalkylsilsesquioxanes, as well as their various applications. Conventionally, the ladder-like polyalkylsilsesquioxanes are synthesized by hydrolysis and condensation of monomers of either alkyltrialkoxysilanes ($RSi(OR')_3$) or alkyltrichlorosilanes ($RSiCl_3$) with water in the presence of an acidic or alkaline catalyst.

An early example of the synthesis of a soluble ladder silicone polymer, (polyphenylsilsesquioxanes) is disclosed in U.S. Pat. No. 3,017,386. The trichlorosilane type monomer, ($PhSiCl_3$), was hydrolysed in diethyl ether below 25° C. The resultant ladder silicone prepolymer solution was washed with water and the diethyl ether solvent then replaced by the high boiling point solvent mixture of benzene, diphenyl and diphenyl ether. The reaction mixture was further polymerized at 250° C. in the presence of an alkaline catalyst to give benzene soluble polyphenylsilsesquioxane.

Many later publications use similar trichlorosilane type monomers to synthesise various ladder-like polyalkylsilsesquioxanes. For example U.S. Pat. No. 5,081,202 and U.S. Pat. No. 5,399,648 (Yamamoto), U.S. Pat. No. 5,939,500, U.S. Pat. No. 5,981,670, U.S. Pat. No. 6,008,310 and U.S. Pat. No. 6,153,689 (Itoh) disclose the use of trichlorosilane type monomers to synthesize various ladder-like polyalkylsilsesquioxanes with or without pendant reactive functional groups, such as hydrogen and vinyl groups. Examples of similar publications are EP0786489, AU6670396, AU706248, CA2202665, JP311268B2, JP200159889, JP200159891, JP200159892 and WO9707156 (all by Itoh).

However, trichlorosilane type monomers are easily hydrolysed by moisture and release toxic and corrosive hydrochloride fumes, and special care must be used in using the monomers to prevent such unwanted hydrolysis. Also, partial hydrolysis of the monomers can lead to unwanted voids in the ladder-like structure of any resultant polymers.

Alternatively, trialkoxylsilane type monomers may be used to synthesise various ladder-like polyalkylsilsesquioxanes. The advantage of using trialkoxylsilane type monomers is that they are more stable, less toxic and easier to handle during storage and synthesis as compared with trichlorosilane type monomers.

U.S. Pat. No. 4,528,390 discloses the synthesis of polymethylsilsesquioxanes powder with improved flow property through hydrolysis and condensation of methyltrimethoxylsilane with aqueous ammonia solution. However, the resultant polymethylsilsesquioxanes does not dissolve in solvents, which may be due to the low regularity of the ladder-like structure of the product.

U.S. Pat. No. 5,026,813 discloses a curable polymethyl-n-hexyl-silsesquioxane synthesised by partial hydrolysis of the mixture of methyltrimethoxylsilane and n-hexyltrimethoxylsilane in the presence of $NH_2C_3H_5(Me)Si(OMe)_2$ catalyst. The resultant ladder silicone copolymer is suitable for moisture-cure coating applications.

U.S. Pat. No. 5,081,202 discloses a process of synthesizing high purity phenyl ladder-like silicone polymers for protection films and interlayer insulating films of electrical devices. $PhSi(OEt)_3$ or $PhSi(OMe)_3$ is hydrolyzed with water to give a lower molecular weight prepolymer, which is further condensed in the presence of KOH catalyst to give high molecular weight polyphenylsilsesquioxanes.

U.S. Pat. No. 5,491,203 discloses a method of using $RSi(OMe)_3$ (R=methyl, ethyl, methacryl, vinyl, mercapto and epoxy groups) to synthesise ladder-like silicone copolymers with pendant functional groups for coating applications. The trimethoxylsilane type monomers are hydrolyzed with acidic water at 10° C. for 1 hour and then at 70° C. for 3 hours. The residual silanol groups of the synthesized ladder silicone polymers are blocked with an excess amount of blocking agent.

U.S. Pat. No. 5,859,162 discloses a process of synthesizing high molecular weight (polymerization degree of 600 to 1000) ladder silicone polymer that contain 1 ppm or less of sodium, potassium, iron, copper, lead, magnesium and chlorine, and 1 ppb or less uranium and thorium. Trialkoxysilanes represented by $RSi(OMe)_3$ (R=methyl, ethyl, propyl, phenyl and vinyl) are hydrolyzed with acidic water to produce a ladder silicone prepolymer with polymerization degree of 5 to 600. The ladder silicone prepolymer is subjected to dehydrative condensation in the presence of an alkaline catalyst and is then purified by dissolution and re-precipitation to obtain a high molecular weight and high purity ladder silicone polymer suitable for electrical insulating applications.

Also, many other approaches for synthesizing polyalkylsilsesquioxanes have been developed. Moisture curable Me-isobutyl ladder silicone polymers synthesized by partial emulsion hydrolysis of respective monomers are disclosed in U.S. Pat. No. 4,746,693. U.S. Pat. No. 5,086,145 describes the use of triacetoxysilane type monomers to synthesise ladder silicone polymers for heat-resistant coating applications. JP11292971 and JP2000103855 disclose a process for synthesising high purity fluoro-containing ladder silicone polymers through either the hydrolysis of fluoro-containing silanes or the conversion of pendant side groups of the ladder-like silicone polymers to achieve high thermal stability. A template method is disclosed by Zhang et al. in the publications given below for the synthesis of highly ordered ladder-like polyalkylsilsesquioxanes. The polyalkylsilsesquioxanes are synthesized by preaminolysis of the $RSiCl_3$ (R=methyl, ethyl, phenyl, vinyl, et al.) monomers with diamines to obtain the coupled dimer template, followed by the acidic-catalyzed hydrolysis and alkaline-catalyzed polycondensation. An advantage of this route is that the result ladder-like polyalkylsilsesquioxanes are highly ordered, but the synthetic route is more complicated and expensive.

"Study on the synthesis and characterization of the soluble, high molecular weight and ladder-like polymethylsilsesquioxanes", Chinese Journal of Polymer Science, 7(2), PP. 183–188, 1989. "Synthesis and characterization of the soluble, high molecular weight and ladder-like polyhydrosilsesquioxanes and its copolymers", Chinese Journal of Polymer Science, 10(4), pp. 361–365, 1992. "In situ poling and orientation stability of chromophore-bearing ladder-like polysiloxanes", Polymers for Advanced Technologies, 7, pp. 98–103, 1994. "The synthesis and X-ray diffraction study of the ladder-like polysilsesquioxanes with side-chain ester groups", Polymers for Advanced Technologies, 8, pp. 662–665, 1996.

In conclusion, there are a variety of synthetic routes to obtain a range of ladder-like polyalkylsilsesquioxanes having a variety of structures and properties. However, it may be appreciated that there are many problems associated with the starting materials, synthetic routes and properties of the resultant polymers disclosed in the prior art. Accordingly, there exists a need for an improved method of synthesizing ladder-like silicone polymers, for the ladder-like polymers themselves, and for compositions and applications using the polymer.

The present invention seeks to provide an improved method of preparing ladder-like silicone polymers and the ladder-like silicone polymers so produced.

This invention relates to a three-stage process of synthesizing ladder-like silicone polymers (generally known as polyalkylsilsesquioxanes) with high ladder-like structure regularity, controlled molecular weight and reactive Si—OH (silanol) functionality. The ladder-like silicone polymers are generally soluble in many common organic solvents and are suitable for use as surface protective materials for various substrates where thermal resistance, electrical insulation or optical transparency is required. These substrates include glass, ceramics, metal, plastics and glass fiber reinforced polymer composites.

According to the present invention there is provided a method for producing a polymer comprising the steps of:
(i) reacting an organic solution of at least one monomer having the formula:

wherein $R^1$, $R^2$, $R^3$ and $R^4$ are each independently selected from the group consisting of:
hydrogen, alkyl, alkoxy, alkenyl, alkynyl, aryl, cycloalkyl, heteroaryl or heterocyclyl;
with a solution of an acid dissolved in water having a specific resistance of at least 18.2 MΩ-cm, at a temperature below about 25° C., to give a prepolymer, and
(ii) reacting a solution of the prepolymer with a solution of an alkaline catalyst at a temperature above about 25° C. to give a polymer, and
(iii) reacting a proportion of the free Si—OH groups of the polymer with a predetermined sub-stoichiometric amount of a blocking agent to give a partially blocked polymer.

Preferably, $R^1$ is methyl, ethyl, propyl, butyl, n-hexyl, cyclohexyl, cyanopropyl, vinyl, hydro, aminopropyl, phenyl, or 3-glycidoxy propyl.

Conveniently, $R^2$, $R^3$ and $R^4$ are independently methyl or ethyl.

Advantageously, two different monomers are reacted together in step (i).

Preferably, the concentration of the at least one monomer in step (i) is from about 0.5 to about 4 mol/kg solvent.

Conveniently, the concentration of the at least one monomer in step (i) is from about 1 to about 3 mol/kg solvent.

Advantageously, the concentration of the at least one monomer in step (i) is from about 2 to about 3 mol/kg solvent.

Preferably, the solution of the at least one monomer comprises at least one solvent selected from the group consisting of benzene, toluene, xylene, methyl isobutyl ketone, methyl ethyl ketone, diethyl ether and isopropyl ether.

Conveniently, the solution of the at least one monomer comprises methyl isobutyl ketone.

Advantageously, the reaction time for step (i) is from about 3 to about 48 hours.

Preferably, the reaction time for step (i) is from about 8 to about 24 hours.

Conveniently, the reaction time for step (i) is from about 10 to about 20 hours.

Advantageously, the reaction temperature for step (i) is below about 15° C.

Preferably, the reaction temperature for step (i) is below about 5° C.

Conveniently, the molar ratio of the water to the at least one monomer is from about 3 to 1 to about 20 to 1.

Advantageously, the molar ratio of the water to the at least one monomer is from about 6 to 1 to about 12 to 1.

Preferably, the molar ratio of the water to the at least one monomer is from about 10 to 1 to about 12 to 1.

Conveniently, the concentration of the acid in step (i) is from about 1 to about 15 mol %.

Advantageously, the concentration of the acid in step (i) is from about 1 to about 5 mol %.

Preferably, the concentration of the acid in step (i) is from about 2 to about 3 mol %.

Conveniently, the acid in step (i) is selected from the group consisting of hydrochloric acid, phosphoric acid, sulphuric acid, acetic acid, and aromatic sulphonic acid.

Advantageously, the concentration of the prepolymer in step (ii) is from about 1 to about 30 wt %.

Preferably, the concentration of the prepolymer in step (ii) is from about 5 to about 20 wt %.

Conveniently, the concentration of the prepolymer in step (ii) is about 10 wt %.

Advantageously, the reaction time for step (ii) is from about 0.5 to about 10 hours.

Preferably, the reaction time for step (ii) is about 2 hours.

Conveniently, the solvent for step (ii) is methyl isobutyl ketone.

Advantageously, the reaction temperature for step (ii) is from about 30 to about 80° C.

Preferably, the reaction temperature for step (ii) is from about 40 to about 70° C.

Conveniently, the catalyst for step (ii) is KOH in methanol.

Advantageously, the concentration of the catalyst solution used in step (ii) is about 1 g/l.

Preferably, the concentration of the catalyst in the reaction mixture of step (ii) is from about 5 to about 20 wt % with respect to the prepolymer.

Conveniently, the concentration of the catalyst in the reaction mixture of step (ii) is from about 7 wt % with respect to the prepolymer.

Advantageously, the reaction time for step (iii) is from about 1 to about 5 hours.

Preferably, the reaction time for step (iii) is from about 2 to about 4 hours.

Conveniently, the reaction time for step (iii) is from about 20 to about 90° C.

Advantageously, the reaction time for step (iii) is from about 30 to about 80° C.

Preferably, the blocking agent for step (iii) is a trialkylchlorosilane.

Conveniently, the trialkychlorosilane is a dimethylalkylchlorosilane.

Advantageously, the alkyl group of the dimethyl alkyl chlorosilane is selected from the group consisting of methyl, 3-glycidoxypropyl, vinyl, hydro and cyanopropyl.

Preferably, the blocking agent for step (iii) is hexamethyldisiloxane.

Conveniently, the amount of blocking agent used in step (iii) is from about 1 to about 90% per mole of Si-atoms in the polymer.

Advantageously, the amount of blocking agent used in step (iii) is from about 5 to about 50% per mole of Si-atoms in the polymer.

Preferably, the amount of blocking agent used in step (iii) is from about 10 to about 30% per mole of Si-atoms in the polymer.

Conveniently, the amount of blocking agent used in step (iii) is from about 25%.

According to a further aspect of the present invention, there is provided a method for producing a prepolymer of the invention.

According to another aspect of the present invention, there is provided a method for producing a polymer of the invention.

According to a yet further aspect of the present invention, there is provided a method for producing a partially blocked polymer of the invention.

According to a yet another aspect of the present invention there is provided a method for producing a partially blocked polymer comprising the step of reacting a proportion of the free Si—OH groups of a polymer with a predetermined sub-stoichiometric amount of a blocking agent to give a partially blocked polymer.

According to further aspects of the present invention, there are provided a polymer, prepolymer and partially blocked polymer of the invention.

In order that the invention may be more readily understood, and so that further features thereof may be appreciated, the invention will now be described, by way of example, with reference to the accompanying drawings in which.

As used herein, the following terms shall have the following meanings:

"Alkyl", either alone or in combination, means an optionally substituted straight-chain or branched-chain alkyl radical containing preferably 1–15 carbon atoms ($C_1$–$C_{15}$), more preferably 1–8 carbon atoms ($C_1$–$C_8$), and most preferably 1–2 carbon atoms ($C_1$–$C_2$). Examples of such radicals include methyl, ethyl, n-propyl, isopropyl, n-butyl, tert-butyl, pentyl, hexyl, octyl and the like.

"Alkenyl", either alone or in combination, means an optionally substituted straight-chain or branched-chain hydrocarbon radical having one or more double bonds, preferably 1–2 double bonds and more preferably one double bond, and containing preferably 2–15 carbon atoms ($C_2$–$C_{15}$), more preferably 2–8 carbon atoms ($C_2$–$C_8$), and must preferably 2–3 carbon atoms ($C_2$–$C_3$). Examples of such alkenyl radicals include vinyl, alkyl, 1,4-butadienyl and the like.

"Alkynyl", either alone or in combination, means an optionally substituted straight-chain or branched chain hydrocarbon radical having one or more triple bonds, preferably 1–2 triple bonds and more preferably one triple bond, and containing preferably 2–15 carbon atoms ($C_2$–$C_{15}$), more preferably 2–8 carbon atoms ($C_2$–$C_8$), and most preferably 2–3 carbon atoms ($C_2$–$C_3$). Examples of such alkynyl radicals include ethynyl, propynyl, butynyl and the like.

"Alkoxy", either alone or in combination, means a radical of the type "R—O—" wherein "R" is an alkyl radical as defined above and "O" is an oxygen atom. Examples of such alkoxy radicals include methoxy, ethoxy, n-butoxy, tert-butoxy and the like.

"Aryl", either alone or in combination, means an optionally substituted phenyl radical or an aromatic fused ring radical such as a naphthyl radical. Examples of aryl radicals are phenyl, 4-methoxyphenyl, 4-fluorophenyl, 3-aminophenyl, 1-naphthyl, 2-naphthyl, 6-amino-2-naphthyl, and the like.

"Cycloalkyl", either alone or in combination, means an optionally substituted saturated or partially saturated, monocyclic or bicyclic alkyl radical, preferably monocyclic, containing preferably 3–10 carbon atoms ($C_3$–$C_{10}$), more preferably 3–8 carbon atoms ($C_3$–$C_8$), even more preferably 3–6 carbon atoms ($C_3$–$C_6$), which is optionally benzo fused and which is optionally substituted as defined herein with respect to the definition of aryl. Examples of such cycloalkyl radicals include cyclopropyl, cyclobutyl, cyclopentyl, cyclohexyl, tetrahydronaphthyl, and the like.

"Heteroatoms" means nitrogen, oxygen and sulfur heteroatoms.

"Heterocyclyl", either alone or in combination, means an optionally substituted saturated or partially unsaturated, preferably one double bond, monocyclic or bicyclic, preferably monocyclic, heterocycle radical containing at least one, nitrogen, oxygen or sulfur atom ring member and having preferably 3–8 ring members in each ring, more and more preferably 5–6 ring members in each ring. "Heterocyclyl" radicals may optionally be substituted on at least one, carbon atoms by halogen, alkyl, alkoxy, hydroxy, oxo, thioxo, aryl, aralkyl, heteroaryl, heteroaralkyl, amidino, N-alkylamidino, alkoxycarbonylamino, alkylsulfonylamino and the like, and/or on a secondary nitrogen atom by hydroxy, alkyl, aralkoxycarbonyl, alkanoyl, alkoxycarbonyl, heteroaralkyl, aryl or aralkyl radicals. Examples of such heterocyclyl radicals include pyrrolidinyl, piperidinyl, piperazinyl, tetrahydrofuryl, benzopyranyl, and the like.

"Heteroaryl", either alone or in combination, means a monocyclic or bicyclic, preferably monocyclic, aromatic heterocycle radical, having at least one, nitrogen, oxygen or sulfur atom ring member and having preferably 5–6 ring members in each ring, which is optionally benzo fused or saturated carbocyclic fused, and which is optionally substituted as defined above with respect to the definitions of aryl and heterocyclyl. Examples of such heteroaryl groups include imidazolyl, pyrrolyl, pyrazolyl, pyridyl, furyl, thienyl, oxazolyl, thiazolyl, indolyl, benzofuryl, and the like.

"Halogen" and "halo", alone or in combination, means fluoro, chloro, bromo or iodo radicals.

The groups indicated above as being "optionally substituted" may be substituted by one or more substituents selected from the groups consisting of alkyl, alkoxy, halogen, hydroxy, amino, azido, nitro, cyano, haloalkyl, carboxy, alkoxycarbonyl, cycloalkyl, heterocyclo, alkanoylamino, amido, amidino, alkoxycarbonylamino, N-alkylamidino, alkylamino, dialkylamino, N-alkylamido, N,N-dialkylamido, aralkoxycarbonylamino, alkylthio, alkylsulfinyl, alkylsulfonyl and the like.

The method of the present invention relates to a three stage method for the preparation of ladder-like silicone polymers. Such ladder-like silicone polymers have the general structure given below.

where each R may be one of various groups including hydroxyl, alkoxyl, alkyl, aryl and hydrogen.

The first step comprises hydrolysis of trialkoxyalkylsilane-like monomers of the general formula $R^1$—Si($OR^2$)($OR^3$)($OR^4$) with partial polymerisation under carefully controlled conditions to give relatively low molecular weight ladder-like oligomers, which will herein be referred generally to as "prepolymers". The prepolymers of the invention are suitable for synthesising polymers with relatively highly ordered ladder-like structure.

The second stage of the method of the invention comprises further dehydrative polymerisation of the prepolymers to give higher molecular weight ladder-like polymers, herein generally referred to as "polymers". Such polymers are in themselves a useful product, and may be used in a variety of applications in compositions, for instance in coatings.

However, such polymers may be further modified in the third stage of the invention by the deliberate partial blocking of a proportion of the free pendant Si—OH groups (silanol groups), which are blocked using a pre-determined amount of blocking agent to give a ladder-like silicone polymer having a proportion of blocked silanol groups and a proportion of free silanol groups, herein referred to as a "partially blocked polymer". Such partially blocked silicone polymers may be stored for relatively long periods of time and are in themselves useful, and may also be used in a variety of applications and compositions, such as coatings and adhesives.

The first stage of the method will now be discussed in more detail.

It has been found that by careful control of the reaction conditions and reagents, prepolymers may be produced having controlled high regularity of structure and controlled molecular weight. This is achieved by careful control of the reaction temperature and by the use of certain starting materials. Suitable monomers for the first stage of the method are trialkoxyalkylsilanes having the formula given below:

wherein $R^1$, $R^2$, $R^3$ and $R^4$ are each independently selected from the group consisting of:

hydrogen, alkyl, alkoxy, alkenyl, alkynyl, aryl, cycloalkyl, heteroaryl or heterocyclyl;

with a solution of an acid in water at a temperature below about 25° C. High purity water having a specific resistance of at least 18.2 MΩ-cm should be used in acid solution. Suitable acids including hydrogen chloride. The reaction should be continued until substantially complete hydrolysis of the monomers has occurred. Typically, the reaction is complete by 48 hours, and it is preferable for the reaction to be performed for about 10 to about 20 hours. The high regularity of structural resulting prepolymer may be controlled by the concentration of the monomer and solution and the temperature of the reaction mixture, the purity of the water, and the rate of addition of the acid solution.

Typically the monomer, such as an alkyltrimethoxylsilane, is mixed with an organic solvent and is poured into a reactor equipped with a mechanical stirrer, a dropping funnel and a thermometer. At the required reaction temperature and with constant stirring, an excess amount of ultrapure water containing an acidic catalyst is added in a drop-wise manner. After the addition, the reaction mixture is stirred overnight to complete the hydrolysis reaction and the hydrolyzed monomers are partially condensed to form the low molecular weight ladder-like silicone prepolymer. The prepolymer solution is purified by washing with water several times until the washing water approaches neutral pH. The prepolymer solution is then vacuum distilled to remove water and methanol, as well as a part of the solvent. The key point of the first stage is to control the hydrolysis condition to synthesise the highly ordered ladder-like backbone of the prepolymer.

The R groups of the monomer may be relatively inert, or may be functionalised or reactive groups. Examples of suitable R groups include methyl, ethyl, propyl, butyl, hexyl, octyl, vinyl, hydrogen, 3-glycidoxypropyl, aminopropyl, cyanopropyl, and phenyl. Preferably, the OR groups are lower alkoxyl groups, such as methoxyl and ethoxyl groups. The starting monomers can be used as chemical reagent grade or industrial grade and may be used as received from commercial sources. The monomers may also be purified through vacuum distillation before use.

The monomer concentration in the first stage is very important. If the concentration is too low, the condensation reaction of the hydrolysed silanol groups with alkoxyl groups or other silanol groups may be too slow and cannot achieve the required condensation level of ladder silicone prepolymers. If the concentration is too high, the condensation reaction may be too fast and voids may be introduced into the ladder-like structure and may even cause gelation of the reaction mixture. The preferred monomer concentration of the present invention is about 0.5 to about 4 mol/kg solvent, more preferably about 1 to about 3 mol/kg solvent.

It is to be appreciated that the monomers may be used alone or in combinations of different monomers. The organic solvents suitable for the present invention are those non-aqueous organic solvents that can readily dissolve both the starting monomers and the synthesized ladder-like polyalkylsilsesquioxanes, as well as their respective prepolymers. These solvents include:

(1) Ketones—such as, methyl ethyl ketone and methyl isobutyl ketone;

(2) Ethers—such as diethyl ether, isopropyl either;

(3) Aromatic solvents—benzene, toluene, xylene.

The solvents may be used as chemical grade or industrial grade. Depending on the nature of monomers and the resulted ladder-like polymers, the above solvents can be used either individually or in admixtures. Methyl isobutyl ketone is the most preferable commonly used solvent that is suitable in the synthesis of the ladder-like polyalkylsilsesquioxanes of the present invention.

The first stage of the method of the present invention uses high purity water to hydrolyze the starting materials. Preferably, high purity water with a specific resistance of at least 18.2 MΩ-cm is used. Theoretically, one mole of the alkyltrialkoxylsilane monomer needs only 1.5 moles of water to hydrolyze the alkoxyl groups. However, in practice an excess amount of water is used to ensure the complete hydrolysis of the monomers. Preferably, the molar ratio of water to monomer should be about 3:1 to about 20:1, and more preferably from about 6:1 to about 12:1.

An acid is used to catalyze the hydrolysis reaction of the "OR" groups of the monomers and the subsequent condensation reaction of the generated silanol groups with alkoxyl groups and other silanol groups. The molar ratio of the acidic catalyst to monomer is important for the reaction. If the molar ratio is low, such as below 1%, the hydrolysis and condensation reaction rates are relatively slow, thus resulting in partial hydrolysis of monomers and so producing a very low molecular weight prepolymer. If the molar ratio is too high, such as more than 15%, the hydrolysis and condensation reactions are relatively fast, and so irregular cross-linking may occur, giving a silicone polymer with low structural regularity and low solubility.

The reaction temperature in the first stage should be kept below about 25° C. to ensure a smooth slow reaction rate of both the hydrolysis and condensation to achieve a highly ordered ladder-like structure. Preferably, the reaction temperature should be within about −15 to about 15° C. Preferably, the acidic catalyst is diluted with water and the acidic water is slowly dripped into the reaction solution to keep the reaction temperature within the required temperature range.

The reaction time in the first stage should be long enough to ensure the complete hydrolysis of alkyltrialkoxylsilanes and a certain level of polycondensation of the hydrolyzed monomers, and is preferably from about 3 to about 48 hours, and more preferably from about 10 to about 20 hours. Under the above-mentioned reaction conditions, the polycondensation reaction in the first stage reaches equilibrium and the molecular weight of the prepolymer does not further increase even when the reaction time is increased. The weight average molecular weight of the prepolymer synthesized in the first stage is normally below 2000.

The Second Stage—Alkaline-Catalyzed Polycondensation

In the second stage, the ladder silicone prepolymer synthesized in the first stage is further condensed in the presence of an alkaline catalyst. Typically, the reaction mixture of a solution of prepolymer in an organic solvent is heated to a required reaction temperature, and then the required amount of alkaline catalyst is added. The reaction mixture is then allowed to stir at that temperature for a few hours. Through careful control of the prepolymer concentration, catalyst usage and the reaction temperature and time, ladder-like polymers with different molecular weights may be obtained. The reaction condition of the second stage may be controlled to adjust the molecular weight of the synthesized ladder-like polyalkylsilsesquioxanes.

The prepolymer concentration is one of the major parameters in determining condensation rate and the ladder-like structure of the resulted polyalkylsilsesquioxanes. In the present invention, the prepolymer concentration is preferably about 1 to about 30 wt % of the total solution, more preferably about 5 to about 20% of the total solution. Generally, the higher the prepolymer concentration, the higher the molecular weight of the synthesized polymer, keeping the other reaction parameters consistent.

Suitable alkaline catalysts include metal hydroxides such as sodium hydroxide and potassium hydroxide, metal oxides such as magnesium oxide. The preferable alkaline catalyst solution is a methanol solution of potassium hydroxide (KOH), prepared by dissolving 1 gram of KOH into 1 litre of methanol. Preferably the amount of alkaline catalyst solution used is about 5 to about 20 wt % of the prepolymer in the reaction solution. It is more preferable to use a lower catalyst concentration, such as about 7 wt %, so that the polycondensation reaction rate can be easily controlled.

The elevated reaction temperature is another important parameter in determining the condensation reaction in the second stage. Preferably, the reaction temperature of the second stage is from about 20 to about 90° C., more preferably about 30 to about 80° C.

If the prepolymer concentration, catalyst concentration and the reaction temperature are kept constant in the second stage, the reaction time may be used to control the molecular weight of the synthesized polymers. The longer the reaction time used, the higher the molecular weight of the polymers synthesized. In the present invention, the weight average molecular weight of the synthesized ladder-like polymers may be controlled from about 2,000 to about 100,000 through adjusting the reaction time in the second stage.

The Third Stage—Partial Blocking of Silanol Groups

Although the polymers produced by the second stage of the method of the present invention as described above are in themselves useful, they may be further modified in a third stage of the invention to product partially blocked polymers. Such partial blocking of the polymers changes their properties, so that the partially blocked polymers may be useful in a variety of applications and compositions, for example in coatings and adhesives.

When the required molecular weight of the ladder-like polyalkylsilsesquioxane is reached, the condensation reaction in the second stage may be quenched by the third stage described below.

Upon completion of the reaction of the second stage, a proportion of the residual hydroxyl (silanol) groups of the polyalkylsilsesquioxanes may be blocked by the addition of a blocking agent. A predetermined sub-stoichiometric amount of the blocking agent is slowly added in the reaction mixture. The reaction mixture is stirred a few hours to complete the blocking reaction. An excess amount of water is introduced into the reaction mixture to terminate the blocking reaction. The blocked polyalkylsilsesquioxane solution is purified by washing with water several times until the pH of the washing water approaches neutral. The partially blocked polyalkylsilsesquioxanes may be recovered by removing the solvent by vacuum distillation.

Suitable blocking agents suitable for this invention include:

(1) Silanes with the general formula of $R^5R^6R^7SiOR^8$, where $R^5$, $R^6$ and $R^7$, are each independently selected from the group consisting of:

hydrogen, alkyl, alkoxy, alkenyl, alkynyl, aryl, cycloalkyl, heteroaryl or heterocyclyl, such as methyl, ethyl, propyl, aminopropyl, phenyl, 3-glycidoxypropyl, hexyl, cyclohexyl, octyl, etc., and where $R^8$ is an alkyl group, such as methyl or ethyl.

(2) Trialkylchlorosilanes with the general formula of $R^9R^{10}R^{11}SiCl$ where $R^9$, $R^{10}$ and $R^{11}$ are each independently selected from the group consisting of:

hydrogen, alkyl, alkoxy, alkenyl, alkynyl, aryl, cycloalkyl, heteroaryl or heterocyclyl, such as methyl, ethyl, propyl, vinyl, aminopropyl, phenyl, 3-glysidoxypropyl, hexyl, cyclohexyl, octyl, et al.

(3) Others, such as hexamethyldisiloxane.

Generally speaking, the type (2) silane blocking agents are more efficient than the other types of blocking agents (1) and (3). In addition, the hydrochloric acid generated from the blocking reaction can effectively quench the condensation reaction of the second stage through neutralizing the alkaline catalyst used in the second stage in situ. It is therefore preferable to use the type (2) silane blocking agents. Functional group-containing blocking agents provide a convenient way of introducing functional groups into the polyalkylsilsesquioxanes, giving partially blocked polymers having pendant groups such as vinyl, alkyl, epoxy and hydrogen, which may be further modified, cross-linked etc.

Theoretically, the content of the residual silanol groups of the synthesized polyalkylsilsesquioxanes is determined by the regularity of the ladder-like structure, molecular weight and the blocking level. In the present invention, ladder-like polyalkylsilsesquioxanes with different content of reactive silanol groups may be synthesized by adjusting the predetermined amount of blocking agent to give partially blocked polymers having different properties suitable for various applications. Preferably, the blocking level is 5–50 mol % per each mole Si atoms, more preferably 10–30 mol %.

The ladder-like structure regularity can be characterized by x-ray diffraction (XRD). The XRD spectra of the polymers of the invention were recorded on a Bruker Powder XRD. There are generally two peaks in the XRD spectra of the ladder-like silicone polymers. A sharp peak appears at a lower $2\theta$ from 5–10° depending on the size of the pendant R group, corresponding to the inter-chain distance for the polyalkylsilsesquioxanes. This peak can be used to characterize the degree of regular structure of the ladder-like polymers. A wide hump-like peak appears at a higher $2\theta$ (centered at around 20–30°) representing the thickness of the polymer chains. A relatively higher and sharper peak at $2\theta=5-10°$ and a relatively weak hump-like peak at $2\theta=20-30°$ indicate a higher ladder-like structural regularity.

The ladder-like structural regularity can also be characterized by $^{29}$Si NMR spectra. There are normally two main peaks in a $^{29}$Si NMR spectrum. A peak ($\alpha$) at $\delta=-55.3$ ppm (using tetramethylsilane as the reference) is related to defective Si-atoms (i.e. those Si-atoms not part of the ladder-like regular polymer structure), while the peak ($\beta$) at $\delta=-64.8$ ppm corresponds to the resonance absorption of the Si-atoms actually incorporated into the regular ladder-like polymer backbone. The ratio, $\beta/(\alpha+\beta)$, can be used to characterize the ladder-like structure regularity of polyalkylsilsesquioxanes.

The invention will now be illustrated with examples. All of the reagents and starting materials are commercially available from sources such as:
Methyltrimethoxysilane (Z-6070) and phenyltrimethoxysilane (Z-6124) from Dow Corning; 3-glycidoxypropyltrimethoxysilane (Silquest A-187), methacrylpropyltrimethoxysilane (Silquest A-186) and vinyltrimethoxysilane (Silquest A-171) from OSI Specialties, Crompton.

EXAMPLE 1

Figure 1:
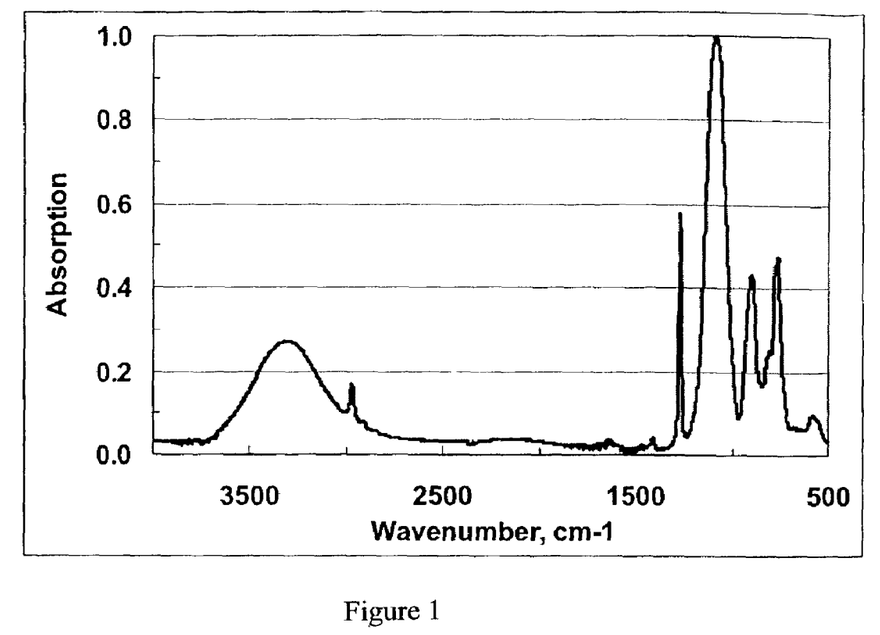
FIG. 1 is an FTIR spectrum of a ladder-like silicone prepolymer of the invention.

In the first stage, 750 grams (5.5 moles) of methyltrimethoxysilane and 2400 grams of methyl isobutyl ketone (MIBK) were put into a reactor equipped with a mechanical stirrer, a dropping funnel and a thermometer. The monomer concentration was 2.29 mol/kg solvent. The reaction solution was then cooled down to a sub-ambient temperature within (−15–15° C.) with a salt ice-water bath. While maintaining the sub-ambient temperature of the reaction solution, a mixture of 991 grams (55 moles) of de-ionized water and 11.94 grams (0.121 moles) of concentrated (37%) hydrochloric acid was added was added drop-wisely into the reactor under the constant stirring. The molar ratio of water to monomer was 10:1 and the molar ratio of acidic catalyst to monomer was 2.2 mol %. After the addition, the reaction mixture was stirred overnight (20 hours) to complete the hydrolysis reaction and the hydrolyzed monomers had partially condensed to form low molecular weight ladder-like silicone pre-polymer. The ladder-like silicone pre-polymer solution was then transferred into a separating funnel. The lower aqueous layer was removed and the organic layer was purified by washing with water several times until the washed water reached neutrality. The prepolymer solution was then vacuum distilled to remove water and methanol, as well as a part of the solvent. FIG. 1 shows the Fourier Transform Infrared (FTR) Spectrum of the ladder-like silicone prepolymer synthesized in the first stage. The content of the residual silanol groups in the prepolymer can be characterized in terms of the peak height ratio (OH/SiO) of the silanol absorption peak at around 3340 cm$^{-1}$ and the Si—O absorption peak at 1124 cm$^{-1}$ in FTIR spectrum. The OH/SiO ratio of the prepolymer synthesized in the first stage was 0.25. The yield of the first stage was 93.9% with respect to the theoretical yield.

Figure 2:
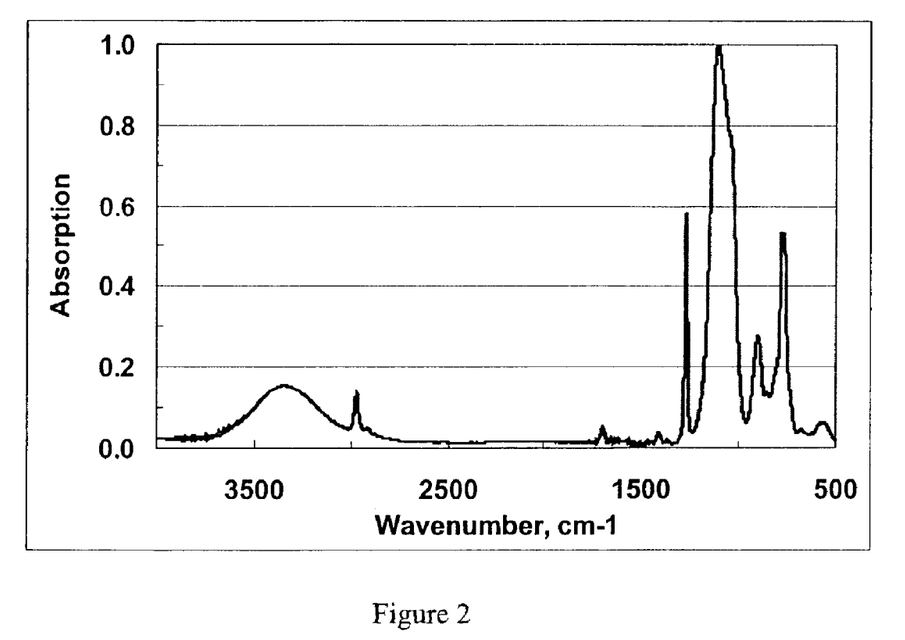
FIG. 2 is an FTIR spectrum of a ladder-like silicone polymer of the invention.
Figure 4:
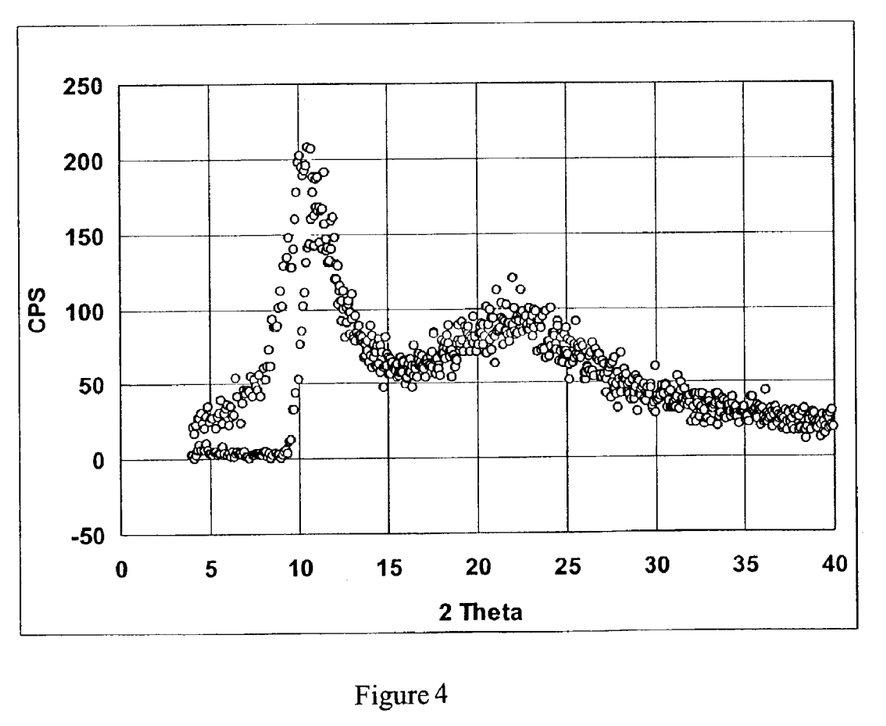
FIG. 4 is an XRD spectrum of a ladder-like polymer of the invention.

In the second stage, the ladder silicone prepolymer synthesized in the first stage with a concentration of 10 wt % in MIBK solution was further condensed in the presence of an alkaline catalyst in the form of 1 g KOH/1 MeOH. Upon the reaction mixture reaching the required action temperature of 50° C., 7 wt % with respect to the prepolymer of alkaline catalyst solution was added into the reaction solution. The reaction solution was then condensed at 50° C. for 2 hours. FIG. 2 shows the FTIR Spectrum of the ladder-like polymethylsilsesquioxane synthesized in the second stage. The OH/SiO of the polymethylsilsesquioxane synthesized in the second stage was reduced to 0.17, indicating the further condensation reaction of silanol groups in the second stage. In the x-ray diffraction (XRD) spectrum of the synthesized ladder-like polymethylsilsesquioxane (FIG. 4), a relatively higher and sharp peak at $2\theta=10°$ and a relative weak hump-like peak at $2\theta=15°-30°$ indicate the higher ladder-like structure regularity.

In the third stage, a proportion of the residual silanol groups of the polymer produced in the second stage were partially blocked by trimethyl silylation with the blocking agent, trimethylchlorosilane, 10 mol % of blocking agent per mole of Si atoms in the polymethylsilsesquioxane was added into the reaction mixture at 50° C. The reaction mixture was stirred at 20–50° C. for 2–4 hours to complete the blocking reaction, then an excess amount of water was introduced into the reaction mixture to terminate the blocking reaction. The resulting solution was purified by washing with water several times until the washing water reached to neutral. The partially blocked polymer was recovered by removing the solvent through vacuum distillation.

Figure 3:
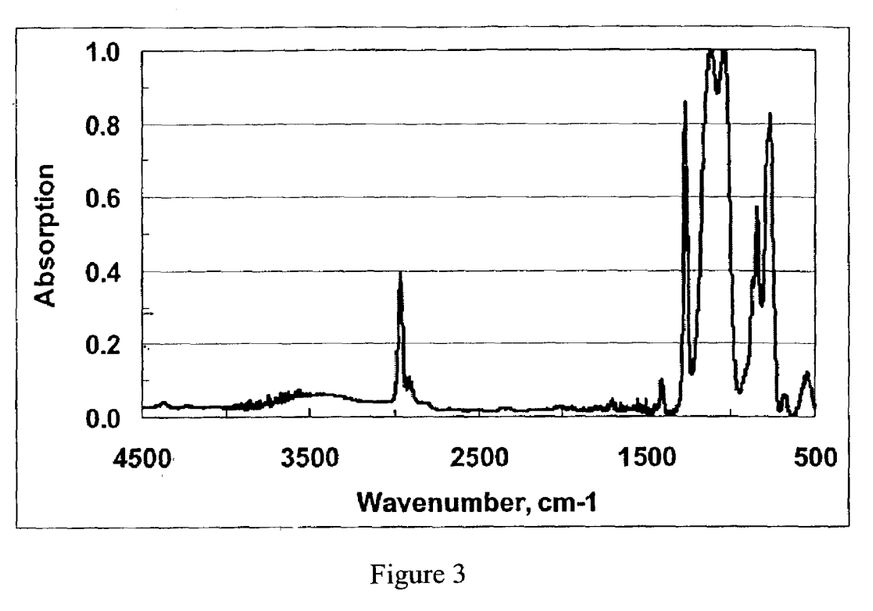
FIG. 3 is an FTIR spectrum of a partially blocked ladder-like silicone polymer of the invention.

The partially blocked polymer was stable in both solid power form and in organic solution. The yield of the synthesized partially blocked polymethylsilsesquioxan is 89%. Its weight average molecular weight is 17400 measured by a gel permeation chromatography (GPC, Waters) using polystyrenes as standards. FIG. 3 shows the FTIR Spectrum of the partially blocked polymethylsilsesquioxane synthesized in the third stage. The OH/SiO of the partially blocked polymethylsilsesquioxane synthesized in the third stage was further redued to 0.07, indicating the partial blocking of the silanol groups taken place in the third stage. The $^{29}$Si NMR measurement of the synthesized polymethylsilsesquioxane showed its highly ordered ladder-like structure, as the peak ($\alpha$) at $\delta=-55.3$ ppm related to the defective Si-atoms was not observed.

EXAMPLES 2 AND 3

Ladder-like methylsilsesquioxane prepolymers were synthesized in the same manner as the first stage in Example 1, except the different molar ratios of water to monomer, methyltrimethoxylsilane, were used. As shown in Table 1, the molar ratio of water to monomer should be not less than 6:1 to ensure the complete hydrolysis of monomers in the first stage.

TABLE 1

Effect of molar ratio of water to monomer on the hydrolysis reaction in the first stage.

| | Molar ratio Water:Monomer | Remarks |
|---|---|---|
| EX2 | 3:1 | Partially hydrolyzed, unstable |
| EX3 | 6:1 | Fully hydrolyzed, stable |
| EX1 | 10:1 | Fully hydrolyzed, stable |

EXAMPLES 4 AND 5

Ladder-like methylsilsesquioxane prepolymers were synthesized in the same manner as the first stage in Example 1, except the different monomer concentrations were used. As shown in Table 2, the monomer concentration within the range of 0.74–2.94 mol/kg solvent can be used as it does not show much effect on the yield and condensation level of the synthesized ladder silicone pre-polymer in the first stage.

TABLE 2

Effect of monomer concentration on the hydrolysis reaction in the first stage.

| S/N | Monomer Concentration mol/kg solvent | Yield % | Silanol content OH/SiO |
|---|---|---|---|
| EX4 | 0.74 | 91.5 | 0.27 |
| EX1 | 2.29 | 93.9 | 0.26 |
| EX5 | 2.94 | 93.9 | 0.28 |

EXAMPLES 6 AND 7

Ladder-like methylsilsesquioxane prepolymers were synthesized in the same manner as the first stage in Example 1, except the different reaction time was used. As shown in Table 3, a lower prepolymer yield was obtained when the reaction time was less than 10 hours. On the other hand, higher prepolymer yields were achieved by those experiments with the reaction time more than 16 hours. It is also found that the residual silanol content of the synthesized prepolymer appears to be independent of the reaction time in the first stage.

TABLE 3

Effect of reaction time on the hydrolysis reaction in the first stage.

| S/N | Reaction time hours | Yield % | Residual OH content OH/SiO |
|---|---|---|---|
| EX6 | 8 | 65.4 | 0.28 |
| EX7 | 16 | 93.9 | 0.26 |
| EX1 | 20 | 93.2 | 0.28 |

EXAMPLES 8 AND 9

Ladder-like polyalkysilsesquioxanes with different molecular weight were synthesized in the similar manner as in the second stage of Example 1. The effect of the reaction condition of the second stage, namely, the alkaline catalyst concentration and the reaction time, on the molecular weight of the synthesized ladder-like polyalkylsilsesquioxanes was shown in Table 4.

TABLE 4

Effect of the reaction condition in the second stage on the molecular weight of the synthesized polyalkylsilsesquioxanes.

| S/N | Alkaline catalyst (KOH/MeOH 1 g/l) wt % of prepolymer | Temp °C. | Time hrs | Mn | Mw | D = Mw/Mn |
|---|---|---|---|---|---|---|
| EX8 | 7 | 50 | 1 | 1100 | 2300 | 3.35 |
| | | | 2 | 4700 | 17400 | 3.73 |
| | | | 3 | 6600 | 26700 | 4.05 |
| | | | 4 | 7100 | 31600 | 4.44 |
| | | | 5 | 8900 | 39800 | 4.46 |
| | | | 6 | 8600 | 40500 | 4.72 |
| EX9 | 10 | 70 | 1 | 7000 | 30300 | 4.30 |
| | | | 2 | 7900 | 45500 | 5.77 |
| | | | 3 | 37800 | 69300 | 1.84 |
| | | | 4 | 44300 | 84500 | 1.90 |
| | | | 5 | 44300 | 100200 | 2.26 |

EXAMPLES 10 AND 15

Ladder-like polymethylsilsesquioxanes with different residual silanol group content were synthesized in a similar manner in Example 1. The residual silanol group content was controlled by the blocking level in the third stage. Table 5 listed the residual silanol contents in terms of the peak height ratio of OH/SiO of the synthesized ladder-like polymethylsilsesquioxanes with different blocking levels. Increasing the blocking level from 5 to 30 mol %, the residual silanol content gradually decreased as the evidence of the OH/SiO decreased from 0.10 to 0.01.

TABLE 5

Effect of blocking level on the residual silanol content of the synthesized ladder-like polymethylsilsesquioxanes.

| S/N | Blocking level mol % of $CH_2SiO_{3/2}$ | Residual OH content OH/SiO |
|---|---|---|
| EX10 | 5 | 0.10 |
| Ex11 | 10 | 0.07 |
| EX12 | 15 | 0.04 |
| EX13 | 20 | 0.02 |
| Ex14 | 25 | 0.01 |
| EX15 | 30 | <0.01 |

EXAMPLE 16

The procedure described in Example 1 in synthesizing polymethylsilsesquioxane can be used to synthesize other polyalkyl-silsesquioxanes. The alkyl groups of the suitable alkyltrimethoxylsilane monomers include ethyl, propyl, butyl, cyclohexyl, phenyl, cyanopropyl and vinyl groups. For example, polyphenylsilsesquioxane was synthesized by hydrolysis and condensation of phenyltrimethoxylsilane following the same methodology of Example 1.

In the first stage, 453.4 grams (2.29 moles) of phenyltrimethoxylsilane and 1000 grams of MIBK were introduced into a reactor. The monomer concentration was 2.29 mol/kg solvent. The reaction solution was then cooled down to below 5° C. with a salt ice-water bath. While maintaining the sub-ambient temperature of the reaction solution, a mixture of 412.2 grams (22.9 moles) of de-ionized water and 4.93 grams (0.05 moles) of concentrated (37%) hydrochloric acid was added drop-wisely into the reactor under the constant stirring. The molar ratio of water to monomer was 10:1 and the molar ratio of acidic catalyst to monomer was 2.2 mol %. After the addition, the reaction mixture was stirred overnight (16 hours). The resulted ladder silicone prepolymer solution was purified by washing with water several times until the washed water reached neutrality. The prepolymer solution was then vacuum distilled to remove water and methanol, as well as a part of the solvent. The higher silanol content (OH/SiO=0.56) of the prepolymer as compared with Example 1 showed the lower condensation level of the hydrolyzed phenyltrimethoxylsilane. The yield of the first stage was 96.6%.

In the second stage, the ladder silicone prepolymer synthesized in the first stage with the prepolymer concentration of 20 wt % in MIBK solution was further condensed in the presence of 7 wt % of the alkaline catalyst (1 g KOH/1 MeOH) with respect to the prepolymer. The reaction solution was then condensed at 80° C. for 2 hours. The silanol content (OH/SiO) of the polymer synthesized in the second stage was reduced to 0.04, indicating the further condensation reaction of silanol groups in the second stage.

Figure 5:
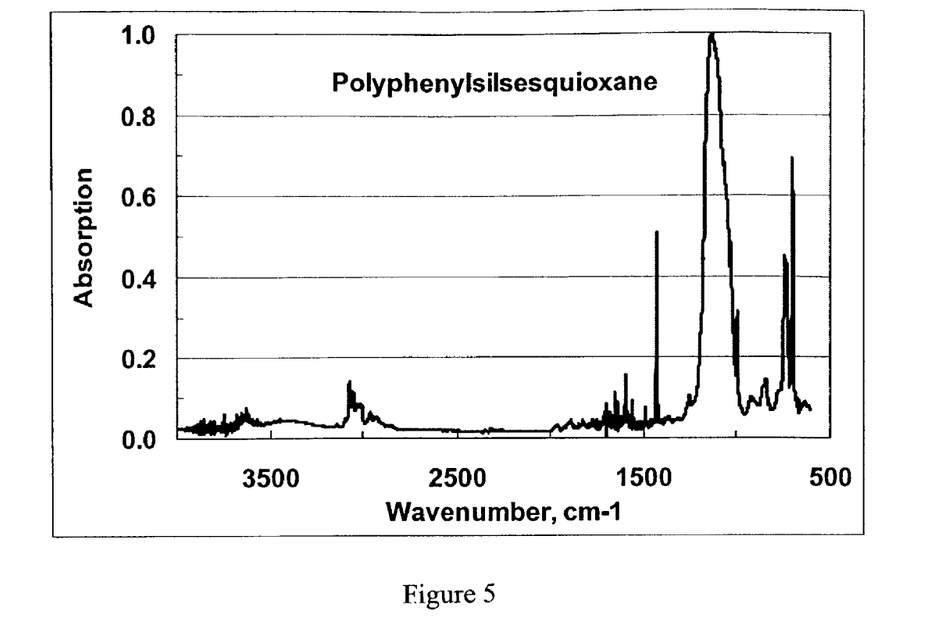
FIG. 5 is an FTIR spectrum of a partially blocked ladder-like silicone polymer of the invention.

Upon the completion of the second stage, the residual silanol groups of ladder silicone copolymer were blocked with 10 mol % of trimethylchlorosilane per mole of Si atoms. The reaction mixture was stirred at 30–80° C. for 3 hours. Then excess amount of water was introduced into the reaction mixture to terminate the blocking reaction. The blocked ladder silicone copolymer solution was purified by washing with water several times until the washing water reached to neutral. The yield of the synthesized polyphenylsesquioxane is 91.5%. Its weight average molecular weight is 6229. The residual silanol content (OH/SiO) of the polyphenylsilsesquioxane was 0.02. FIG. 5 shows the FTIR Spectrum of the synthesized polyphenylsilsesquioxane.

EXAMPLE 17

The procedure described in Example 1 can also be used to synthesize ladder-like silicone copolymers through hydrolysis and condensation of two alkyltrialkoxylsilanes. This example demonstrates how to incorporate the epoxy functional groups into the polyalkylsilsesquioxane backbones through the copolymerisation of two alkyltrialkoxylsilanes, in which one monomer bears a pendant epoxy group.

In the first stage, 534.6 grams (2.7 moles) of phenyltrimethoxylsilane, 70.8 grams of 3-glycidoxypropyltrimethoxylsilane (0.3 moles) and 1000 grams of MIBK were introduced into a reactor. The monomer concentration was 3.0 mol/kg solvent and the molar ratio of phenyltrimethoxylsilane to 3-glycidoxypropyltrimethoxylsilane was 9:1. The reaction solution was then cooled down to below 5° C. with a salt ice-water bath. While maintaining the sub-ambient temperature of the reaction solution, a mixture of 540 grams (30 moles) of de-ionized water and 5.92 grams (0.06 moles) of concentrated (37%) hydrochloric acid was added drop-wisely into the reactor under the constant stirring. The molar ratio of water to monomer was 10:1 and the molar ratio of acidic catalyst to monomer was 2.0 mol %. After the addition, the reaction mixture was stirred overnight (16 hours). The resulted ladder silicone prepolymer solution was purified by washing with water several times until the washed water reached neutrality. The silanol content (OH/SiO) of the prepolymer was 0.18. The yield of the first stage was 90.2%.

In the second stage, the ladder silicone prepolymer synthesized in the first stage with the prepolymer concentration of 10 wt % in MIBK solution was further condensed in the presence of 7 wt % of the alkaline catalyst (1 g KOH/1 MeOH) with respect to the prepolymer. The reaction solution was then condensed at 80° C. for 2 hours. The silanol content (OH/SiO) of the copolymer synthesized in the second stage was 0.19. The higher OH/SiO value as compared with that in the first stage indicated the partial ring opening of epoxy groups during synthesis.

Figure 6:
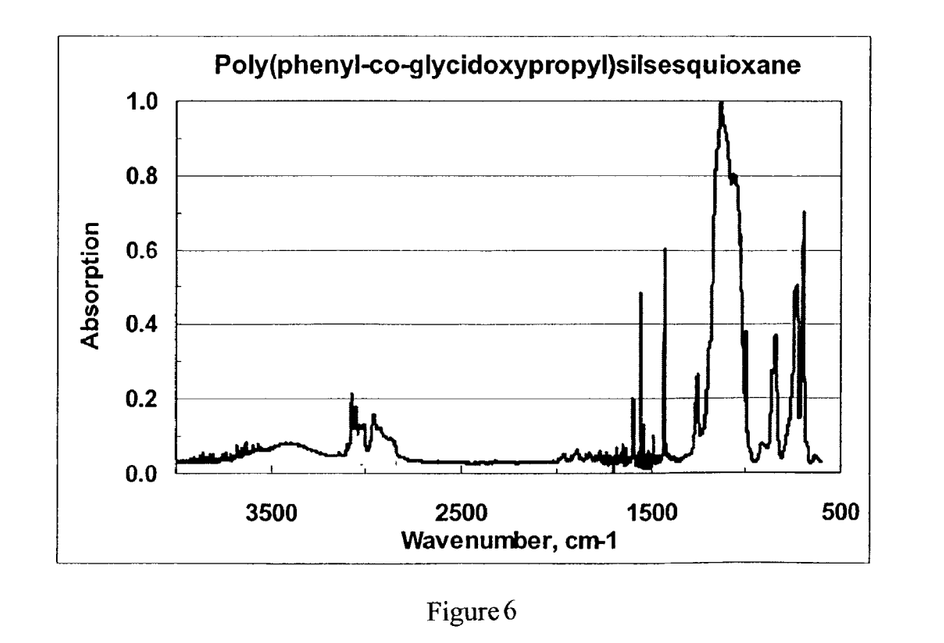
FIG. 6 is an FTIR spectrum of a partially blocked ladder-like silicone polymer of the invention.

Upon the completion of the second stage, the residual silanol groups of ladder silicone copolymer were blocked with 20 mol % of trimethylchlorosilane per mole of Si atoms at 30–80° C. for 3 hours. Then the reaction solution was stirred with an alkaline solution of 22.5 grams (0.56 mol) of sodium hydroxide dissolved in 450 grams of water at ambient temperature overnight to terminate the blocking reaction. The addition of sodium hydroxide is to neutralize the generated hydrochloric acid and to close those opened epoxy rings during the synthesis. The ladder silicone copolymer solution was then purified by washing with water several time until the washing water reached to neutral. The yield of the synthesized poly(phenyl-co-3-glycidoxypropyl) silsesquioxane was 88.9%. Its weight average molecular weight was 6574. FIG. 6 shows the FTIR Spectrum of the synthesized poly(phenyl-co-3-glycidoxypropyl)silsesquioxane. The residual silanol content (OH/SiO) of the copolymer was 0.05.

EXAMPLES 18 TO 21

The functional group containing ladder-like polyalkylsilsesquioxanes can also be synthesized through blocking the non-functional polyalkylsilsesquioxanes with functional group containing blocking agents in the third stage. The non-functional polyalkylsilsesquioxane used in this example is polymethylsilsesquioxane synthesized as in stages 1 and 2 in Example 1. Table 6 lists the functionalized ladder-like polymethyl-silsesquioxanes synthesized by blocking with respective functional bearing blocking agents.

TABLE 6

Functional polymethylsilsesquioxanes synthesized by blocking with respective functional bearing blocking agents

| S/N | R in blocking agents: R(Me$_2$)Si—Cl | Blocking level mol % of Si-atoms | Residual OH content OH/SiO |
|---|---|---|---|
| EX18 | 3-glycidoxypropyl | 25 | 0.01 |
| EX19 | vinyl | 25 | 0.01 |
| EX20 | hydro | 25 | 0.01 |
| EX21 | cyanopropyl | 25 | 0.01 |

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method for producing a polymer comprising the steps of:
   (i) reacting an organic solution of at least one monomer having the formula:

R¹—Si(OR²)(OR³)(OR⁴)

wherein R1, R2, R3 and R4 are each independently selected from the group consisting of:
   hydrogen, alkyl, alkoxy, alkenyl, alkynyl, aryl, cycloalkyl, heteroaryl and heterocyclyl,
   with a solution of an acid dissolved in water having a specific resistance of at least 18.2 MΩ-cm, at a temperature below about 25° C., to give a prepolymer;
   (ii) reacting a solution of the prepolymer with a solution of an alkaline catalyst at a temperature above about 25° C. to give a polymer; and
   (iii) reacting a proportion of the free Si—OH groups of the polymer with a predetermined sub-stoichiometric amount of a blocking agent to give a partially blocked polymer.

2. A method according to claim 1 wherein R¹ is methyl, ethyl, propyl, butyl, n-hexyl, cyclohexyl, cyanopropyl, vinyl, hydro, phenyl, or 3-glycidoxy propyl.

3. A method according to claim 1 wherein R², R³ and R⁴ are independently methyl or ethyl.

4. A method according to claim 1 wherein two different monomers are reacted together in step (i).

5. A method according to claim 1 wherein the concentration of the at least one monomer in step (i) is from about 0.5 to about 4 mol/kg solvent.

6. A method according to claim 5 wherein the concentration of the at least one monomer in step (i) is from about 1 to about 3 mol/kg solvent.

7. A method according to claim 6 wherein the concentration of the at least one monomer in step (i) is from about 2 to about 3 mol/kg solvent.

8. A method for producing a polymer comprising the steps of:
   (i) reacting an organic solution of at least one monomer, the solution comprising at least one solvent selected from the group consisting of benzene, toluene, xylene, methyl isobutyl ketone, methyl ethyl ketone, diethyl ether and isopropyl ether, the at least one monomer having the formula:

R¹—Si(OR²)(OR³)(OR⁴)

wherein R¹, R², R³ and R⁴ are each independently selected from the group consisting of hydrogen, alkyl, alkoxy, alkenyl, alkynyl, aryl, cycloalkyl, heteroaryl and heterocyclyl,
   with a solution of an acid dissolved in water having a specific resistance of at least 18.2 MΩ-cm, at a temperature below about 25° C., to give a prepolymer;
   (ii) reacting a solution of the prepolymer with a solution of an alkaline catalyst at a temperature above about 25° C. to give a polymer; and
   (iii) reacting a proportion of the free Si—OH groups of the polymer with a predetermined stoichiometric amount of a blocking agent to give a partially blocked polymer.

9. A method according to claim 8 wherein the solution of the at least one monomer comprises methyl isobutyl ketone.

10. A method according to claim 8 wherein the reaction time for step (i) is from about 3 to about 48 hours.

11. A method according to claim 10 wherein the reaction time for step (i) is from about 8 to about 24 hours.

12. A method according to claim 11 wherein the reaction time for step (i) is from about 1.0 to about 20 hours.

13. A method according to claim 8 wherein the reaction temperature for step (i) is below about 15° C.

14. A method according to claim 9 wherein the reaction temperature for step (i) is below about 5° C.

15. A method for producing a polymer comprising the steps of (i) reacting an organic solution of at least one monomer having the formula:

R¹—Si(OR²)(OR³)(OR⁴)

wherein R¹, R², R³ and R⁴ are each independently selected from the group consisting of:
   hydrogen, alkyl, alkoxy, alkenyl, alkynyl, aryl, cycloalkyl, heteroaryl and heterocyclyl,
   with a solution of an acid dissolved in water having a specific resistance of at least 18.2 MΩ-cm at a temperature below about 25° C., to give a prepolymer, the molar ratio of the water to the at least one monomer being from about 3 to 1 to about 20 to 1;
   (ii) reacting a solution of the prepolymer with a solution of an alkaline catalyst at a temperature above about 25° C. to give a polymer; and
   (iii) reacting a proportion of the free Si—OH groups of the polymer with a predetermined sub-stoichiometric amount of a blocking agent to give a partially blocked polymer.

16. A method according to claim 15 wherein the molar ratio of the water to the at least one monomer is from about 6 to 1 to about 12 to 1.

17. A method according to claim 16 wherein the molar ratio of the water to the at least one monomer is from about 10 to 1 to about 12 to 1.

18. A method according to claim 15 wherein the concentration of the acid in step (i) is from about 1 to about 15 mol %.

19. A method according to claim 18 wherein the concentration of the acid in step (i) is from about 1 to about 5 mol %.

20. A method according to claim 19 wherein the concentration of the acid in step (i) is from about 2 to about 3 mol %.

21. A method according to claim 1 wherein the acid in step (i) is selected from the group consisting of hydrochloric acid, phosphoric acid, sulphuric acid, acetic acid, and aromatic sulphonic acid.

22. A method according to claim 1 wherein the concentration of the prepolymer in step (ii) is from about 1 to about 30 wt %.

23. A method according to claim 22 wherein the concentration of the prepolymer in step (ii) is from about 5 to about 20 wt %.

24. A method according to claim 22 wherein the concentration of the prepolymer in step (ii) is about 10 wt %.

25. A method according to claim 1 wherein the reaction time for step (ii) is from about 0.5 to about 10 hours.

26. A method according to claim 25 wherein the reaction time for step (ii) is about 2 hours.

27. A method according to claim 1 wherein the solvent for step (ii) is methyl isobutyl ketone.

28. A method according to claim 1 wherein the reaction temperature for step (ii) is from about 30 to about 80° C.

29. A method according to claim 28 wherein the reaction temperature for step (ii) is from about 40 to about 70° C.

30. A method according to claim 1 wherein the catalyst for step (ii) is KOH in methanol.

31. A method according to claim 1 wherein the concentration of the catalyst solution used in step (ii) is about 1 g/l.

32. A method according to claim 1 wherein the concentration of the catalyst in the reaction mixture of step (ii) is from about 5 to about 20 wt % with respect to the prepolymer.

33. A method according to claim 32 wherein the concentration of the catalyst in the reaction mixture of step (ii) is about 7 wt % with respect to the prepolymer.

34. A method according to claim 1 wherein the reaction time for step (iii) is from about 1 to about 5 hours.

35. A method according to claim 34 wherein the reaction time for step (iii) is from about 2 to about 4 hours.

36. A method according to claim 1 wherein the reaction time for step (iii) is from about 20 to about 90° C.

37. A method according to claim 36 wherein the reaction time for step (iii) is from about 30 to about 80° C.

38. A method according to claim 1 wherein the blocking agent for step (iii) is a trialkylchlorosilane.

39. A method according to claim 38 wherein the trialkylchlorosilane is a dimethylalkylchlorosilane.

40. A method according to claim 39 wherein the alkyl group of the dimethyl alkyl chlorosilane is selected from the group consisting of methyl, 3-glycidoxypropyl, vinyl, hydro and cyanopropyl.

41. A method according to claim 1 wherein the blocking agent for step (iii) is hexamethyldisiloxane.

42. A method according to claim 1 wherein the amount of blocking agent used in step (iii) is from about 1 to about 90% per mole of Si-atoms in the polymer.

43. A method according to claim 42 wherein the amount of blocking agent used in step (iii) is from about 5 to about 50% per mole of Si-atoms in the polymer.

44. A method according to claim 43 wherein the amount of blocking agent used in step (iii) is from about 10 to about 30% per mole of Si-atoms in the polymer.

45. A method according to claim 44 wherein the amount of blocking agent used in step (iii) is from about 25%.

46. A partially blocked polymer obtained by the method of claim 1.

* * * * *